Sept. 26, 1933.         L. WALD         1,927,859
GASKET
Filed Jan. 26, 1932

Inventor
Lewis Wald

Patented Sept. 26, 1933

1,927,859

UNITED STATES PATENT OFFICE 1,927,859

GASKET

Lewis Wald, Worcester, Mass., assignor to The Vellumoid Company, Boston, Mass., a corporation of Massachusetts Application January 26, 1932. Serial No. 588,865

3 Claims. (Cl. 154—45.5)

A relatively soft compressible gasket material admirably adapted to withstand the action of water, oil, gasoline, or the like, comprises a fibrous base material containing tanned glue and glycerine. This base material is preferably closely felted as on a paper machine. It is found in practice, however, that if such material is brought into contact with certain metals, such as the magnesium alloys which are now commonly used in aeroplane engine construction because of their light weight, corrosion of the metal may result. Investigation has shown that this is probably due in large measure, at least, to the glycerine in the gasket which forms alcoholates by reaction with certain metals.

The object of this invention is to prevent constituents in such gasket or similar material from causing corrosion of the parts to which they are applied and yet to retain the desirable characteristics of such materials. I have discovered that this may be done by securing to the face or faces of the gasket material which come into contact with the parts likely to corrode, a protecting layer of inert material such as metal foil, either of a nature in itself not subject to such corrosion or protected from such corrosion by an inert cement or adhesive by which the foil or other inert layer is secured to the gasket material.

For a more complete understanding of this invention, reference may be had to the accompanying drawing in which Figure 1 is a fragmentary view partly in section showing a joint employing a gasket constructed in accordance with the invention.

Figure 3:
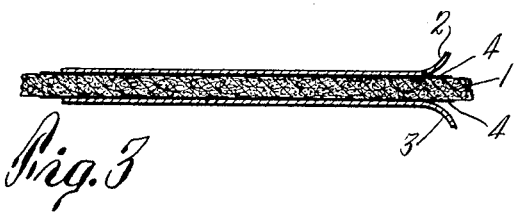
Figure 3 is a somewhat diagrammatic cross section to a much larger scale of the gasket material.
Figure 4:
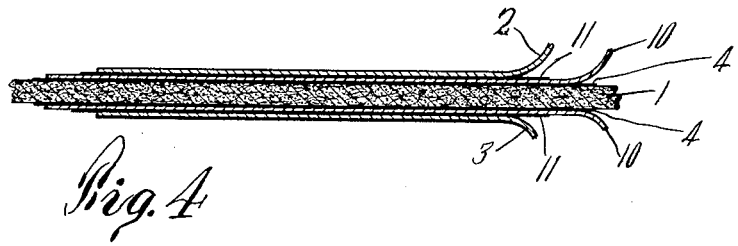
Figure 4 is a section somewhat similar to Figure 3, but showing a different and preferred construction.

Referring to the drawing the gasket shown comprises a fibrous base material as 1, shown best in Figures 3 and 4, which preferably is a porous paper and which is saturated with a packing material which may comprise glutinous material, such as glue, together with a softening agent such as glycerine, and the whole treated with a tanning agent such as formaldehyde, tannin, or the like, to insolubilize the glue. Such material is highly resistant to the action of water even when hot and to the action of oils, greases, and gasoline and the like, but when applied directly to certain types of metal surfaces under some conditions of use it causes corrosion of such metal surfaces. This has been particularly true with the magnesium alloys more recently being used for aeroplane engines and under some conditions it has been found to occur in connection with aluminum or aluminum alloys.

In order to prevent this corrosion of the metal surfaces a layer of inert material inert and impervious to such corrosive constituents such as metal foil may be secured to the face or faces of the gasket base material by adhesive. Various metals from which foils may be made may be used for this purpose, such as aluminum, tin, lead, zinc, and various alloys, and in general such material should be chosen as will not have any detrimental effect by reason of electrolysis or otherwise with the metal part against which the gasket is to be held.

In connection with the magnesium alloy articles aluminum foil has been found quite satisfactory though undoubtedly foils of several other metals or alloys might also be employed if desired.

The foil as at 2, as shown in Figure 3, may be secured directly to the gasket base material by means of a suitable adhesive shown at 4, one adhesive which is satisfactory being sodium silicate. There are, however, other cements on the market, some having vegetable bases, and sold under various trade names, also suitable for the purpose. These various adhesive agents or cements act not only to secure the metal foil to the gasket base material but they also are impervious to and act to prevent direct contact between the foil and any constituents of the base material which might tend to cause corrosion thereof.

In place of adhesively securing the foil directly to the face of the base material it may be secured adhesively to the outer face of a paper layer, as shown at 10 in Figure 4, 11 indicating the layer of adhesive by which the paper layer and the foil are secured together. This is usually preferable to securing the foil directly to the gasket base material since it is easier to secure a good bond between the foil and the paper than it is between the foil and the gasket base material. The paper base 10 to which the foil is adhesively secured, as by the sodium silicate or other suitable agent, may then be readily secured to the face of the gasket base material, for this purpose ordinary animal glue being satisfactory. Animal glue is not a satisfactory adhesive for securing the metal foil directly.

Figure 1:
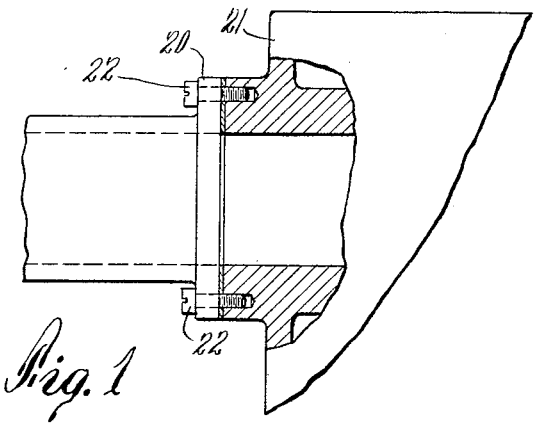
Figure 2:
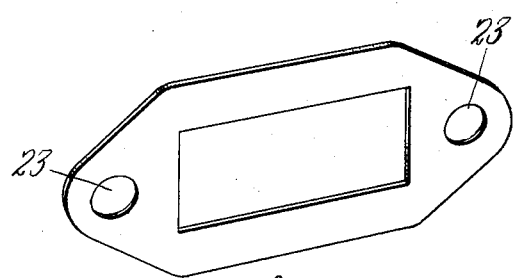
Figure 2 is a perspective of the gasket.

Preferably the gasket base material in sheet form has secured to opposite faces thereof the metal foil or other inert layer either directly or with the interposed paper layer, and then the gaskets are cut from this composite sheet material, one such gasket being shown in Figure 2. It then presents inert outer layers which engage directly with the metal portions 20 and 21 which it is desired to secure together, suitable means such as the securing screws 22 being passed through holes in the mating portions of the parts 20 and 21 and through holes 23 in the gasket.

By this construction any corrosive agents in the base material are prevented from coming into direct contact with the metal parts which they would be liable to corrode and the foil covering is also protected from any constituents of the base which might tend to cause deterioration thereof by the adhesive layer by which the foil is secured to the base material. Since the base material itself is highly resistant to water, oil, gasoline, or the like only that face or those faces which would otherwise contact directly with the metal need be covered by the protecting layer so that the gaskets themselves may be died out from the sheet material to the face or faces of which the protective layer has been applied, the cut edges of the base being left exposed.

From the foregoing description of certain embodiments of this invention it should be evident to those skilled in the art that various changes and modifications might be made without departing from the spirit or scope of this invention as defined by the appended claims.

I claim:

1. An article of manufacture comprising a fibrous base and a saturant for said base including tanned glue and glycerine, said base having a facing layer comprising a metal foil and an adhesive securing said foil to said base, said facing layer being impervious to corrosive elements emanating from said base.

2. An article of manufacture comprising a fibrous base, and a saturant for said base including glycerine, said base having a facing adhesively secured thereto, said facing comprising a layer of paper and a layer of metal foil secured together in face to face relation with said metal foil outwardly disposed, said facing being impervious to constituents of said base liable to cause corrosion of certain metals with which said article may contact under operating conditions.

3. A gasket comprising a fibrous base impregnated with packing material, said base having a facing layer including metal foil secured to said base by adhesive, said layer being impervious to corrosive elements emanating from said base.

LEWIS WALD.